UNITED STATES PATENT OFFICE.

LEONARD ROBERTS COATES, OF BALTIMORE, MARYLAND, ASSIGNOR TO THE AMERICAN BACTERIAIZED FERTILIZER COMPANY, A CORPORATION OF MARYLAND.

FERTILIZER.

No. 899,155.        Specification of Letters Patent.      Patented Sept. 22, 1908.

Application filed December 7, 1905. Serial No. 290,837.

*To all whom it may concern:*

Be it known that I, LEONARD ROBERTS COATES, of the city of Baltimore and State of Maryland, have invented certain Improvements in Fertilizers, of which the following is a specification.

This invention relates to an improvement in artificial fertilizers deficient in nitrogenous matter, by the addition of bacteria for the rapid fixing or gathering of atmospheric nitrogen; and the said invention consists in combining with some dry non-hygroscopic substance, preferably one that is a fertilizer in itself, that is to say,—a substance which does not contain a sufficient amount of moisture to allow of the multiplication and growth of bacteria, such for instance as a substance comprising bone phosphate, dried slack lime and potash salts, etc., of some vegetable or animal matter, which has been treated with water holding in suspension such micro-organisms as fix or gather atmospheric nitrogen, obtained say,—in accordance with the specification forming a part of Letters Patent No. 755,519, granted on the 22nd day of March, 1904, to George T. Moore, and then dried. In one method of carrying out the said invention, I reduce, to practically a meal, clover plants, peas, beans or cotton seed, or the equivalent of such, either vegetable or animal, and after the same has been sterilized in some ordinary way, moisten the meal with a pure culture of the proper bacteria in water, and then dry the material without injury to the bacteria. The dry inoculated material is now in a condition in which the bacteria will remain inactive for an indefinite time, provided moisture is excluded. I then take a quantity of dry non-hygroscopic fertilizer, devoid of free acids or caustic alkalies, or any element injurious to the bacteria, and to the same add a proportion of the dry inoculated material, and inclose the mixture in bags.

It will be noted that in the process above described, the fertilizer treated is in two parts, one only of which is inoculated with bacteria, and the two parts then combined. But it will be understood that a single body of fertilizer which is devoid of materials injurious or detrimental to the life of bacteria and thoroughly or chemically dried, may be sprayed with a small proportion of water rich in bacteria, the water being added only in such quantity as will leave the treated fertilizer dry, in the common acceptation of the term. This change in the method of carrying out the process does not alter the novel character of the completed product, which, in both cases, consists of a practically dry fertilizer in which bacteria are enveloped by a fertilizing material of such nature as will not injuriously affect the life of the micro-organisms which are held therein in an inactive state.

The use of my improved fertilizer obviates the necessity of adding to a fertilizer, nitrogenous matter, or of sprinkling seeds with water carrying bacteria; or of scattering impregnated soil over the land.

By my process, a fertilizer devoid of, or low in nitrogenous matter but valuable in other respects, can be improved without adding to its weight or bulk, and at comparatively little expense, and made the equivalent of a fertilizer high in nitrogen.

I am aware that in Letters Patent No. 679601, granted on the 30th day of July, 1901, to Albert Caron, it is stated, that an artificial fertilizer can be inoculated with bacteria suspended in water, and so applied to the soil, and I do not therefore claim broadly the inoculation of a fertilizer, but claim as my invention:—

1. The combination with a dry non-hygroscopic artificial fertilizer, of ground vegetable or animal matter which has been inoculated with bacteria and dried, substantially as specified.

2. The combination with a dry non-hygroscopic fertilizer, of sterilized vegetable or animal matter which has been inoculated with micro-organisms which fix or gather atmospheric nitrogen, and dried, substantially as specified.

LEONARD ROBERTS COATES.

Witnesses:
THOMAS G. HULL,
WM. T. HOWARD.